United States Patent
Khasnabish

(12) 
(10) Patent No.: US 6,411,679 B1
(45) Date of Patent: Jun. 25, 2002

(54) APPARATUS AND METHOD FOR CALL PROGRESS TIMING MEASUREMENT IN IP TELEPHONY

(75) Inventor: Bhumip Khasnabish, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/398,185

(22) Filed: Sep. 17, 1999

(51) Int. Cl.[7] .......................... H04M 1/24; H04M 3/08; H04M 3/22

(52) U.S. Cl. .......................... 379/9; 379/14; 379/10.02; 379/15.01; 379/22.02; 370/244; 370/252

(58) Field of Search .................. 379/111, 113, 379/114, 115, 133, 135, 372, 399, 34, 134, 1.01, 9, 9.01, 14, 10.02, 15.01, 22.02, 283, 286; 370/241, 242, 244, 249, 250, 252

(56) References Cited

U.S. PATENT DOCUMENTS

| | | | | |
|---|---|---|---|---|
| 5,448,624 A | * | 9/1995 | Hardy et al. ................ | 379/67.1 |
| 5,555,295 A | * | 9/1996 | Bhusri ......................... | 379/112 |
| 5,724,413 A | * | 3/1998 | Suffern et al. ................ | 379/98 |
| 6,101,252 A | * | 8/2000 | Cardillo, IV et al. ........ | 379/361 |
| 6,115,464 A | * | 9/2000 | Lester et al. ................. | 379/283 |

FOREIGN PATENT DOCUMENTS

| | | | | |
|---|---|---|---|---|
| JP | 04317622 | * | 6/1994 | ............ H04L/12/24 |
| JP | 09219891 | * | 8/1997 | ............. H04Q/9/00 |

* cited by examiner

*Primary Examiner*—Binh Tieu
(74) *Attorney, Agent, or Firm*—Leonard Charles Suchyta; James K. Weixel

(57) ABSTRACT

A method and apparatus for measuring call setup time is presented. A first device in a network sends a signal to a second device. The first device monitors for a response from the second device and adjusts an answer tone setting for the second device based on the response. After which, the first device calculates an elapsed time between sending the signal and a receipt of the response.

14 Claims, 6 Drawing Sheets

1

APPARATUS AND METHOD FOR CALL PROGRESS TIMING MEASUREMENT IN IP TELEPHONY

FIELD OF THE INVENTION

The present invention relates to the field of IP telephony. More particularly, the invention relates to an apparatus and method for call progress timing measurement in IP telephony.

BACKGROUND OF THE INVENTION

A telecommunications tester is an automated system used for the testing of telecommunications systems and devices attached to telephone lines. To perform a test, the tester system launches telephone calls to the system or device to be tested in order to exercise certain capabilities and/or validate the proper operation of the system or device by determining the responses to the test call's sequence of stimulus or inputs.

One capability of a telecommunications tester is found in what is called call progress detection. Call progress detection is the general term used to describe how and when a test call makes it way through a telephone network and is answered by the system or device under test. Call progress detection refers to the detection and determination of things such as dial tone, busy tone, ring-back tone, DTMF digit tones, periods of silence, answer detection, on-hook detection, interactive voice response (IVR) start/end, and the like.

Packet networks, such as the Internet, are increasingly being used in conjunction with traditional circuit-switched networks to process telephone calls. This use of packet networks to process telephone calls is more commonly known as IP telephony. Conventional telecommunications testers have difficulty making call progress timing measurements in IP telephony because with the addition of a packet network information that is involved in a telephone call must be packetized and then de-packetized. This packetization and de-packetization can often cause a loss of information that is vital to the detection of a specific tone, such as a ring-back tone. The loss is due to the fact that a given ring-back tone cannot quite be reproduced exactly after going through the packet network. Other causes of information loss in IP telephony include queuing/de-jittering, packing/unpacking, and turning silence detection on/off.

Accordingly, there is presently a need for a system or process for effectively and accurately measuring call progress timing in IP telephony.

SUMMARY OF THE INVENTION

A method consistent with the present invention provides for measuring call setup time in a network comprised of at least two devices. A first device in the network sends a signal to a second device. The first device monitors for a response from the second device and adjusts an answer tone setting for the second device based on the response. After which, the first device calculates an elapsed time between sending the signal and a receipt of the response.

An apparatus consistent with the present invention measures call setup time. The apparatus provides means for sending a signal to a device, means for monitoring for a response from the device, means for adjusting an answer tone setting for the device based on the response, and means for calculating an elapsed time between sending the signal and a receipt of the response.

Another apparatus consistent with the present invention measures call setup time. The apparatus includes a memory having program instructions and a processor responsive to the program instructions. The processor sends a signal to a device, monitors for a response from the device, adjusts an answer tone setting for the device based on the response, and calculates an elapsed time between sending the signal and a receipt of the response.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

The technique of the present invention provides for a measurement of system response time in the various stages of call setup in IP (Internet Protocol) telephony. Time stamps of various required telephony events are read so that the elapsed time of the different stages of call setup can be calculated. Resolution of the time stamps determines resolution of the response time (e.g., if the time stamps are measured using milliseconds, then the response time is measured using milliseconds). When a tone is used by the telephony system to indicate the completion of a stage, the tolerance of the upper and lower bound frequencies of the dual tone multi-frequency (DTMF) and/or the response detection window size can be adjusted as needed so that the tone can be properly detected.

Figure 1:
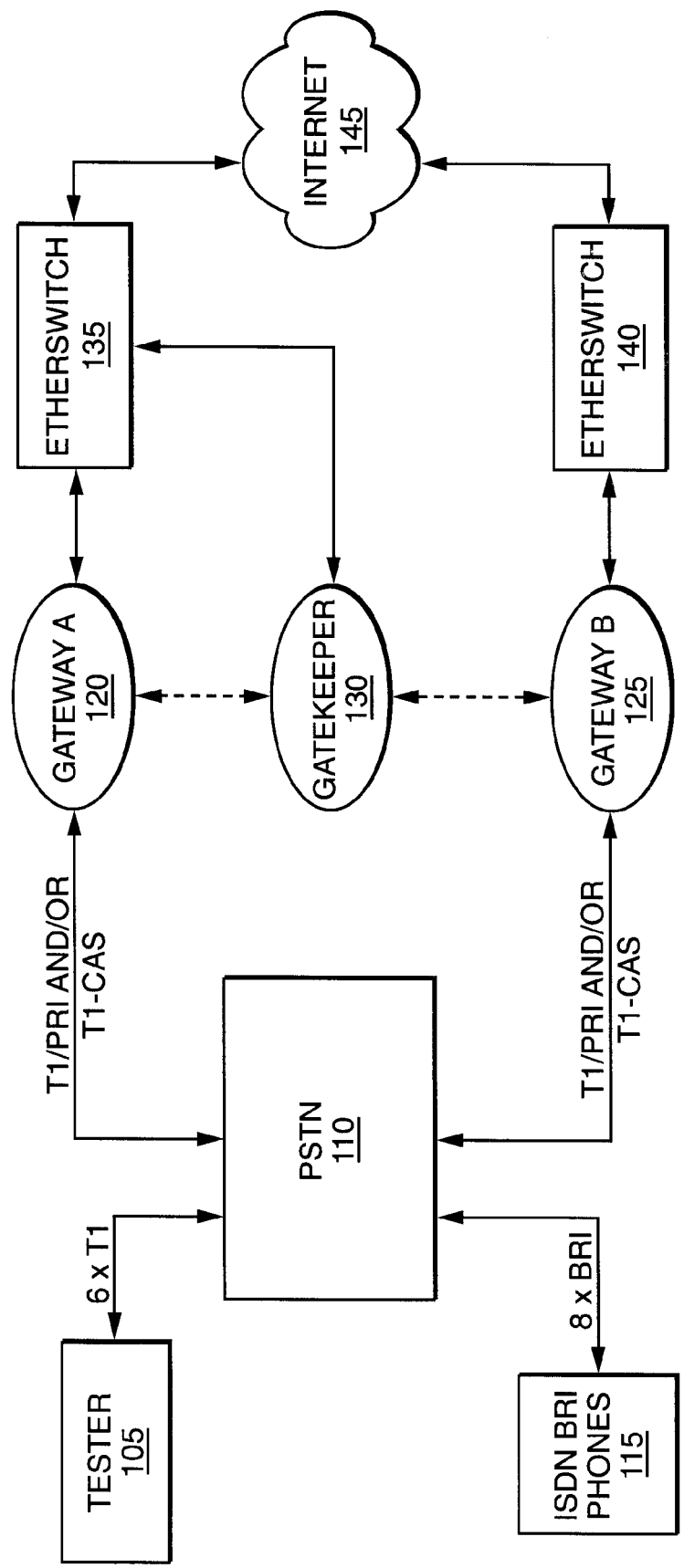
FIG. 1 is a diagram of an exemplary network environment in which the technique of the present invention may be implemented.

FIG. 1 is a diagram of an exemplary network environment 100 in which the technique of the present invention may be implemented. Tester 105 is a telecommunications tester that can be used to test the capabilities of various aspects of network 100. Tester 105 can send both voice and non-voice signals (i.e., a string of digits and characters such as # or *) over the network 100 for controlling and testing a system or device under test. Tester 105 is microprocessor based and preferably makes use of a multi-tasking operating system such as Windows NT or Unix. Multi-tasking is necessary because tester 105 needs to be able to launch, control, and store information about multiple simultaneous telephone test calls. For example tester 105 can be used to generate and analyze bulk phone calls, including measuring the answer time, response time at various stages of call progress, and the time to hear the ring-back tone at the call originating side. Tester 105 typically includes at least one processor which schedules and controls the execution of test scripts running on various channels (i.e., voice channels, control channels). Tester 105 also typically includes a database or other storage means for storing test scripts, test script input data, and test result data. Tester 105 can be, for example, a Hammer telecommunications system tester that uses test scripts written in Hammer visual basic (HVB) language.

Tester 105 is connected to public switched telephone network (PSTN) 110 via up to, for example, six T1 lines. Alternatively, tester 105 could be coupled to a switch that is used to emulate a PSTN (i.e., Madge Access Switch). A plurality of integrated services digital network basic rate interface (ISDN BRI) phones 115 are also connected to PSTN 110 via a plurality of BRI lines. ISDN BRI phones 115 can be used to check the sanity of call progress and human perception based audio quality assessment or measurement. Call progress sanity check refers to hearing the generation of appropriate tones (i.e., a string of DTMF digits, dial tone, ring-tone, etc.) or play-out of an appropriate interactive voice response (IVR) message, etc.

PSTN 110 is also connected to gateway A 120 and gateway B 125 via T1-Channel Associated Signaling (T1-CAS) and/or T1-Primary Rate Interface (T1-PR1) connections. These connections are used to support calls from ISDN BRI phones 115 or from emulated analog phones in tester 105. Note that it is possible to connect more than two gateways to PSTN 110. Gateway A 120 and gateway B 125 are commercially available IP-PSTN gateways such as Siemens' IE2000, Linkon's LinkNet, or Lucent's ITS-SP IP telephony gateways. In the network depicted in FIG. 1, gateway A 120 can be considered the near-end (call originating) gateway, and gateway B 125 can be considered the far-end (call terminating) gateway. Alternatively, the two gateways could switch roles. Gateway A 120 and gateway B 125 are typically connected to two different IP sub-nets, which are interconnected via an IP router, Internet 145. However, it is also possible to connect the two gateways using the same IP sub-net (i.e. both gateways are connected to the same EtherSwitch). Gateway A 120 and gateway B 125 are both logically connected to a gatekeeper 130. Gatekeeper 130 usually runs on a WindowsNT server and is physically connected to the same IP sub-net to which gateway A 120 is connected (note that gatekeeper 130 could alternatively be physically connected to the same IP sub-net that gateway B 125 is connected to). Gatekeeper 130 performs registration, authentication and status (RAS) monitoring functions, when a call establishment request arrives. It is also possible for gatekeeper 130 to maintain call detail record (CDR) files.

Gateway A 120 and gateway B 125 are connected to EtherSwitch 135 and EtherSwitch 140, respectively, via Ethernet links (i.e., 10/100 BT). EtherSwitch 135 and EtherSwitch 140 provide for the connection of multiple sub-nets to a central switch. Within each EtherSwitch, paralleled circuit switching allows for the simultaneous transport of multiple packets across the switch. EtherSwitch 135 is also connected to gatekeeper 130. EtherSwitch 135 and EtherSwitch 140 are both connected to the IP router, Internet 145.

Alternatively, EtherSwitch 135 and EtherSwitch 140 could be connected to an IP network impairment emulator to emulate the impairments that the Internet brings to real-time communications (e.g., voice).

When placing a call in network 100, appropriate dialing plans and PSTN (or Madge) configurations are used to make connections from one channel of tester 105 or ISDN BRI phone to the other channel of tester 105 or ISDN BRI phone either directly through PSTN 110, or using one or two gateways. In this manner, calls can be made over either only the PSTN 110 or through the Internet 145. Note that Internet 145 can also be a cluster or mesh of internet routers.

In IP telephony, a call is usually setup in multiple stages. In the first stage a phone number is dialed to reach a near-end or call-originating IP-PSTN gateway (i.e., gateway A 120). The next two stages involve user identification through delivering an x-digit user-id and then a y-digit personal identification number (PIN) to an authentication and/or billing server (i.e., gatekeeper 130). Then the user is provided with a last stage dial tone and is allowed to dial a destination phone number provided that the authentication is successful.

Figure 2:
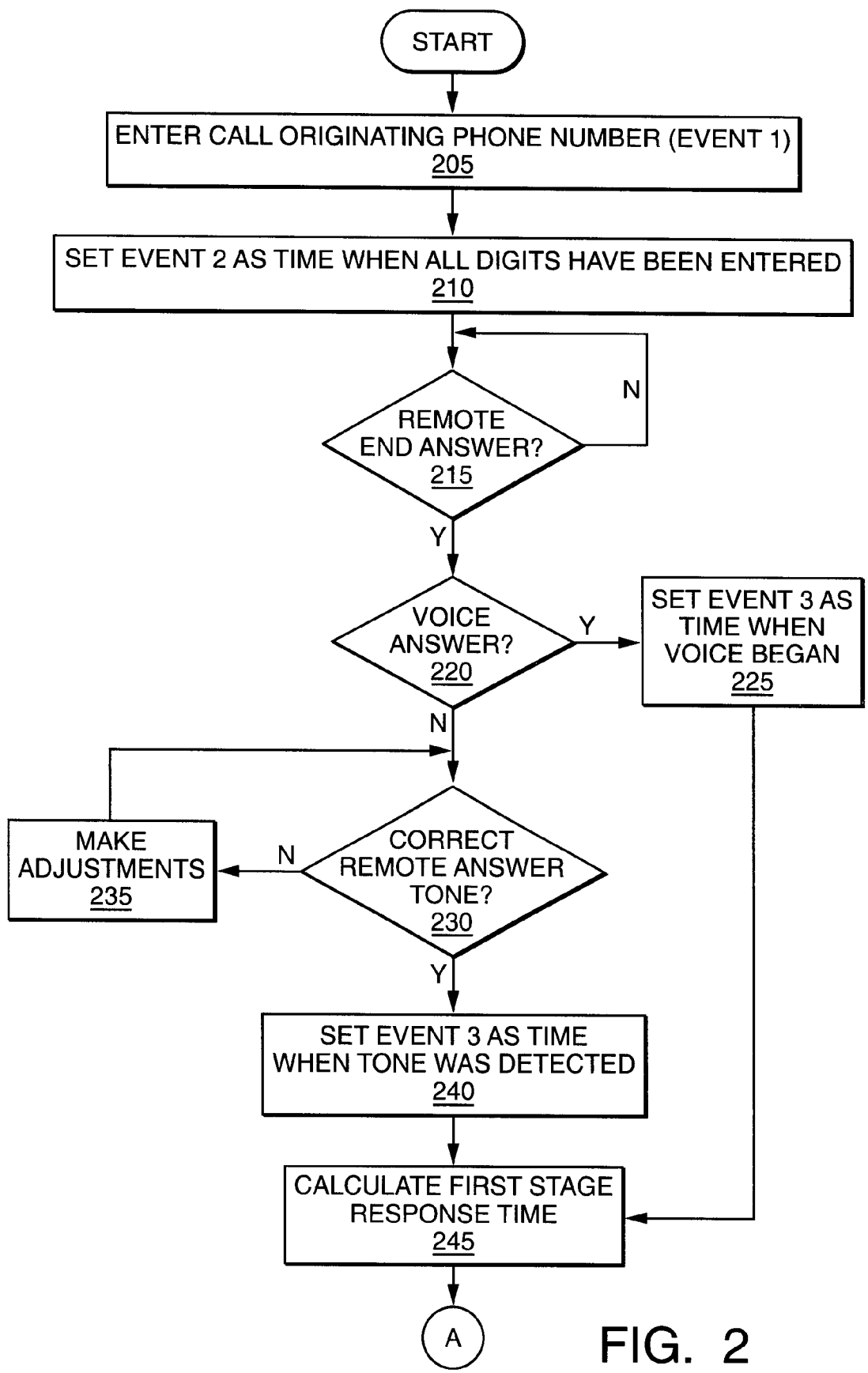
FIG. 2 is an exemplary flowchart of a process for measuring the system response time for the first stage of a call setup process in accordance with the present invention.

The technique of the present invention can be used to measure system response time at each stage of the aforementioned call setup. In one embodiment, the technique can be implemented using test scripts written in HVB language and run by tester 105. FIG. 2 shows a flowchart of an exemplary method for measuring the system response time for the first stage of the call setup. In order to place a call in the present invention, a user will enter the phone number associated with a near-end or call originating IP-PSTN gateway (step 205). This gateway may correspond to gateway A 120. This step is designated as event 1 by the system and a time-stamp corresponding to the user entering the phone number is read by tester 105. Once all of the digits of the phone number have actually been sent by tester 105, tester 105 reads a time-stamp corresponding to the event and designates it as event 2 (step 210). Tester 105 then waits until the call originating gateway responds to the number being sent (step 215). Once the gateway makes a first indication of a remote answer, a determination is made as to whether the answer is a voice answer (step 220). For example, an IVR message could be played that indicates that the system is now ready to accept a user-id from the user. If a voice answer is detected, then a time-stamp corresponding to the beginning of the voice is read and set by tester 105 as event 3 (step 225). Note that when a voice answer is used, the end of the voice must be reached before the next action can be started. Tester 105 can then calculate the response time of the first stage as the difference between the time stamps of event 3 and event 2 (step 245).

If the response by the gateway is one or more answer tones instead of an IVR message, then a determination is made as to whether the tone(s) are the correct/precise tone(s) that are supposed to be heard (step 230). For example, in some implementations, one or more dual tone multi-frequency (DTMF) digits (i.e., 9s) are used to indicate the first stage's response, while in others, DTMF digits followed by a continuous tone (which could be a dial tone) are used for that purpose. Due to the different types of possible tones, it is important to determine what the tone actually is. The manufacturer of a given device (i.e. a gateway) will sometimes supply this information. In IP telephony, however, many manufacturers have not yet taken the time to determine exactly how the measurements of the tone(s) vary compared to the traditional circuit-switched network. In those cases when the manufacturer has not supplied the pertinent information, the tone needs to be determined through trials and testing. This corresponds to what happens when tester 105 does not recognize the answer tone. Adjustments need to be made so that the tone(s) can be recognized (step 235). In this step, there is addition, detection, and tuning of the tones so that the readiness of the next stage can be detected. The upper and lower frequencies and the tolerances at the boundary of a given DTMF tone, and its detection window size need to be adjusted in order to properly adjust the tone. Generally, tolerance can vary from ±1 to ±100 Hz, and detection window size can vary from 2 to 10 msec or higher. When there is a tone that tester 105 does not recognize, tester 105 adds or subtracts tolerance and/or detection window size in predetermined increments (i.e., 1 Hz for tolerance, 1 msec for detection window size) and then attempts to recognize the tone again. Tester 105 repeatedly adjusts and tunes the tolerance and/or the detection window size until the tone is recognized (imagine somebody playing with the knob on a radio until a station comes in clearly).

Once tester 105 verifies that the correct tone has been detected, a time-stamp corresponding to the detection of the tone is read and designated as event 3 (step 240). After which, the first stage response time can be calculated as the difference between the time stamps of event 3 and event 2 (step 245). The second stage can then begin.

Figure 3:
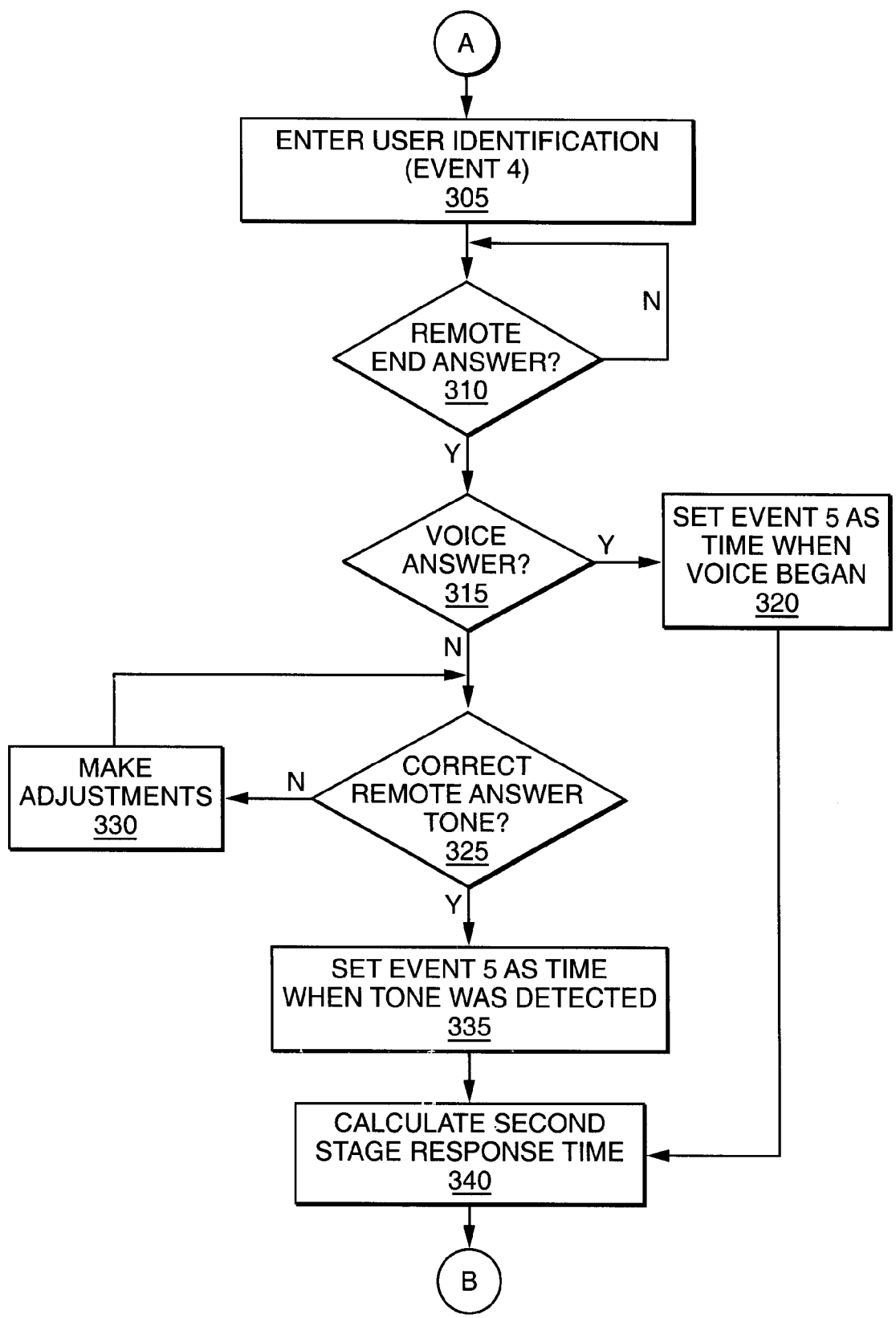
FIG. 3 is an exemplary flowchart of a process for measuring the system response time for the second stage of a call setup process in accordance with the present invention.

FIG. 3 shows a flowchart of an exemplary method for measuring the system response time for the second stage of the call setup. When the user hears the beginning of an IVR message or answer tone after dialing the local or call originating gateway's phone number (i.e. phone number for gateway A 120), it is an indication that the user should enter a user-id number (step 305). This number is usually a string of digits with a # sign at the end. A time-stamp corresponding to the user entering the user-id is read by tester 105 and designated as event 4 (step 305). Steps 310, 315, 320, 325, 330, and 335 proceed in a manner similar to steps 215, 220, 225, 230, 235, and 240 of FIG. 2, except the detection of the beginning of the voice or answer tone is designated as event 5. The second stage response time is calculated as the difference between the time stamps of event 5 and event 4 (step 340). If for some reason the identification was not successful (i.e., invalid user-id), then a busy tone or an IVR message stating that the identification failed can be sent to the user. If the identification was successful, then the caller may proceed to the third stage of call setup.

Figure 4:
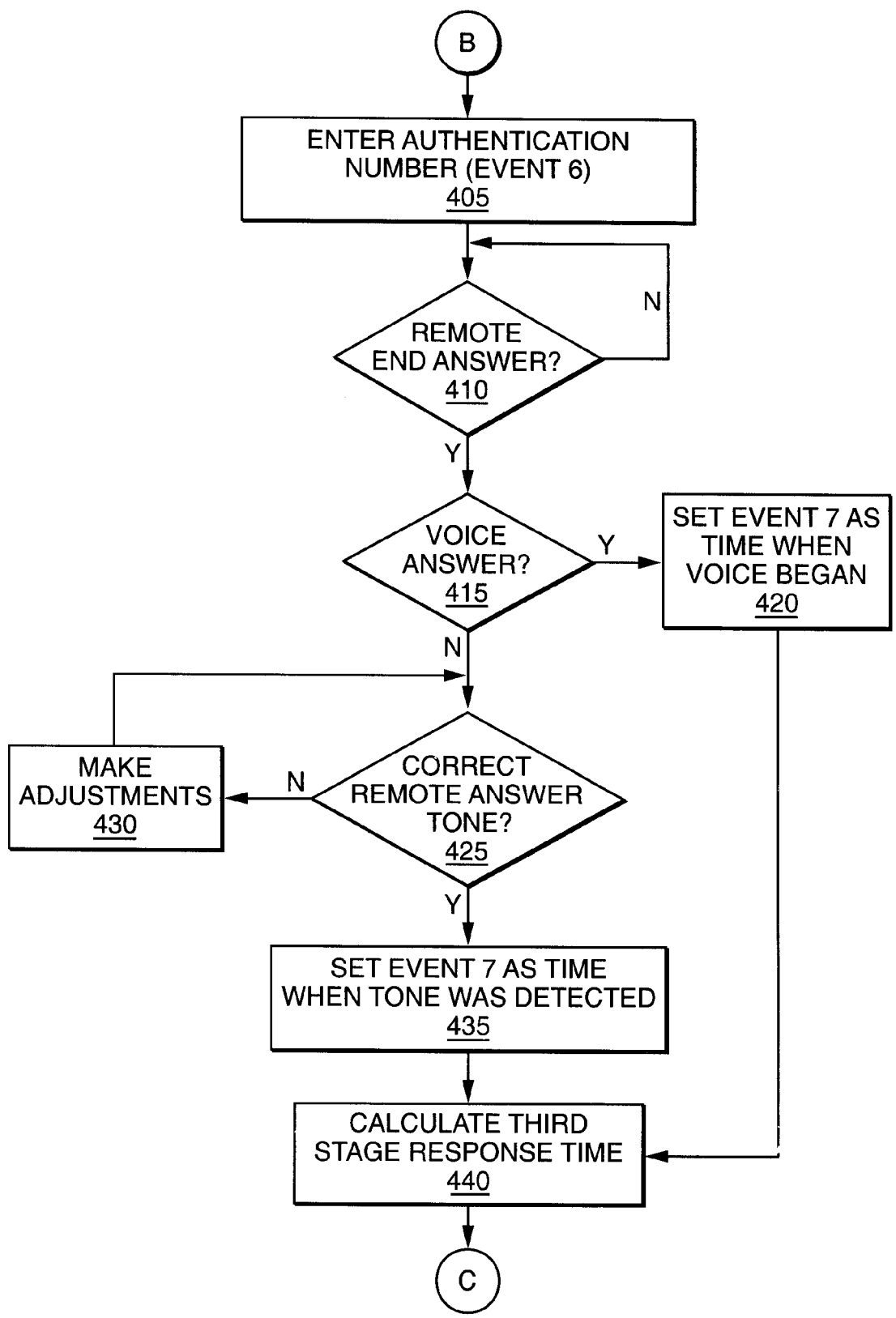
FIG. 4 is an exemplary flowchart of a process for measuring the system response time for the third stage of a call setup process in accordance with the present invention.

FIG. 4 shows a flowchart of an exemplary method for measuring the system response time for the third stage of the call setup. A successful identification indicates that the system is ready for the user to provide authentication. Authentication is usually provided through the use of a four to eight digit PIN followed by the # sign (step 405). A time-stamp corresponding to the user entering the authentication is read by tester 105 and designated as event 6 (step 405). Steps 410, 415, 420, 425, 430, and 435 proceed in a manner similar to steps 215, 220, 225, 230, 235, and 240 of FIG. 2, except the detection of the voice or answer tone is designated as event 7. The third stage response time is calculated as the difference between the time stamps of event 7 and event 6 (step 440). If for some reason the authentication was not successful (i.e., invalid PIN), then a busy tone, fast busy tone, or an IVR message stating that the authentication failed can be sent to the user. If the authentication was successful, then the fourth or final stage may proceed.

Figure 5:
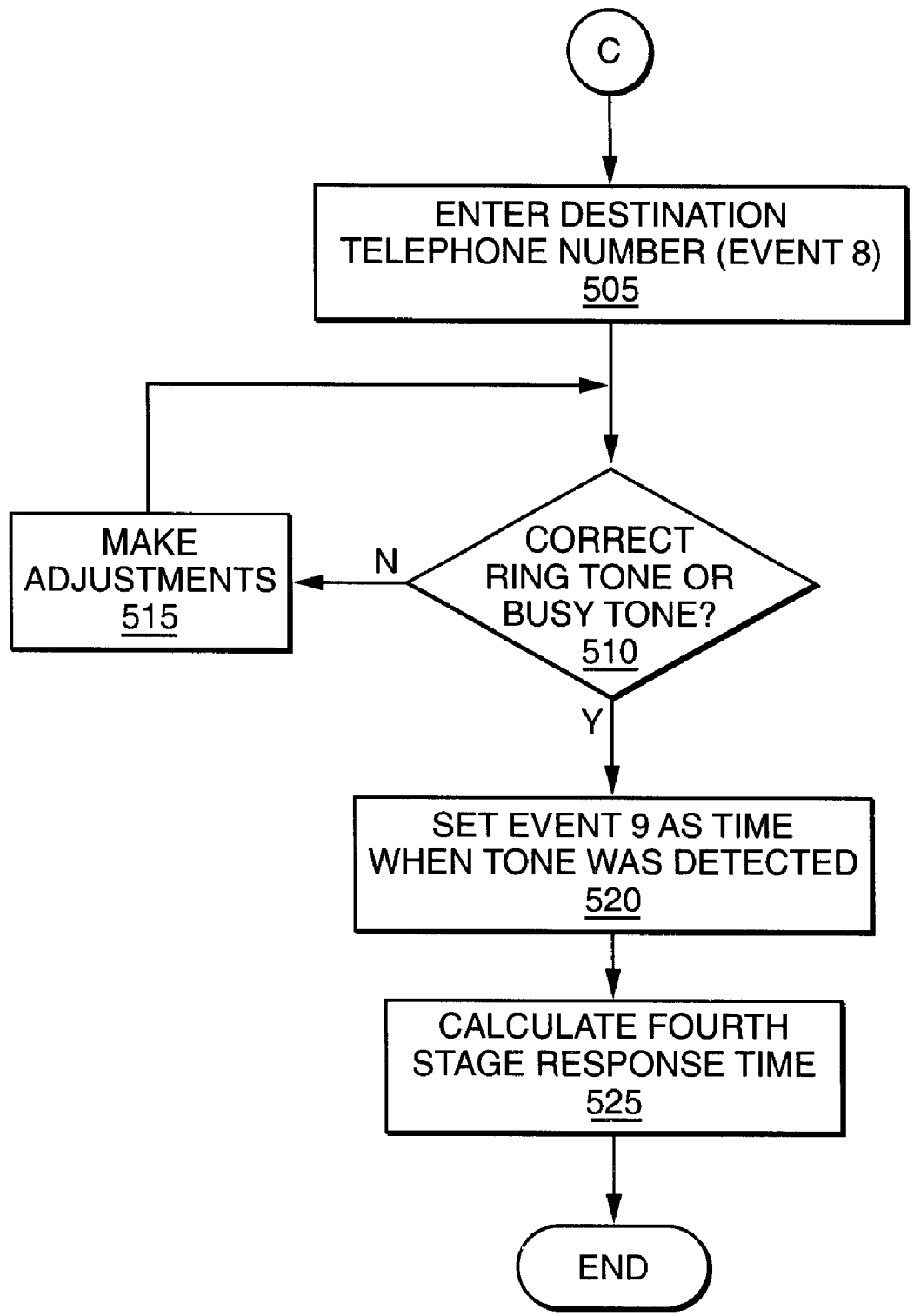
FIG. 5 is an exemplary flowchart of a process for measuring the system response time for the fourth stage of a call setup process in accordance with the present invention.

FIG. 5 shows a flowchart of an exemplary method for measuring the system response time for the fourth stage of the call setup. After there is a successful authentication, the user hears a dial tone or an IVR message indicating that a destination number can be dialed. At that point, the user dials the destination number (i.e., the called party's E.164 address), which is preferably a string of digits with the # sign at the end (step 505). A time-stamp corresponding to the last digit of the destination telephone number being entered is read by tester 105 and designated as event 8 (step 505). After the destination number has been dialed, a ring-back tone or busy tone is heard by the caller, assuming no error in the process. Detection of the correct ring-back tone or busy tone (step 510) and adjusting of tolerance and/or detection window size (step 515) occurs in a manner similar to steps 230 and 235 of FIG. 2. Once the ring-back tone or busy tone has been properly detected, a time-stamp corresponding to the tone being heard is read by tester 105 and designated as event 9 (step 520). The fourth stage response time is then calculated as the difference between the time stamps of event 9 and event 8 (step 525).

Figure 6:
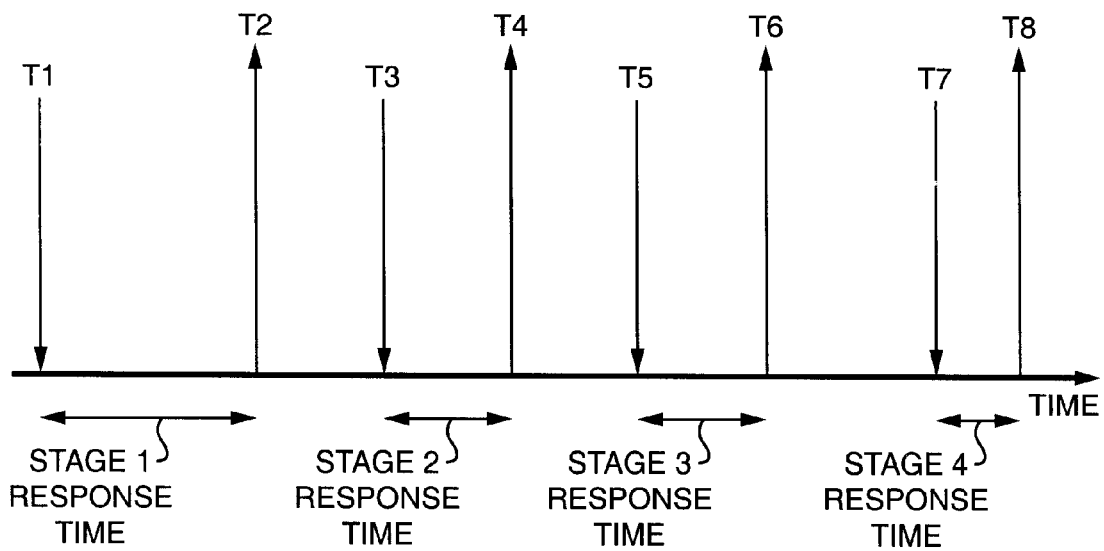
FIG. 6 is an exemplary diagram of the time it takes to setup a call using caller authentication.

FIG. 6 is an exemplary diagram of the time it takes to setup a call using a PIN based caller authentication. T1 represents the time the local or call originating gateway's phone number is entered into the system. T2 represents the remote answer tone or IVR message being detected in response to the call originating phone number. T3 represents the user-id being entered. T4 represents the remote answer tone or IVR message being detected in response to the user-id. T5 represents the user authentication (i.e., PIN) being entered. T6 represents the remote answer tone or IVR message being detected in response to the user authentication. T7 represents the destination phone number being entered. T8 represents the ring-back tone or busy tone being heard in response to the destination number. Stage 1 response time is T2-T1. Stage 2 response time is T4-T3. Stage 3 response time is T6-T5. Stage 4 response time is T8-T7. The total setup time is the sum of the response times of the four stages.

Figure 7:
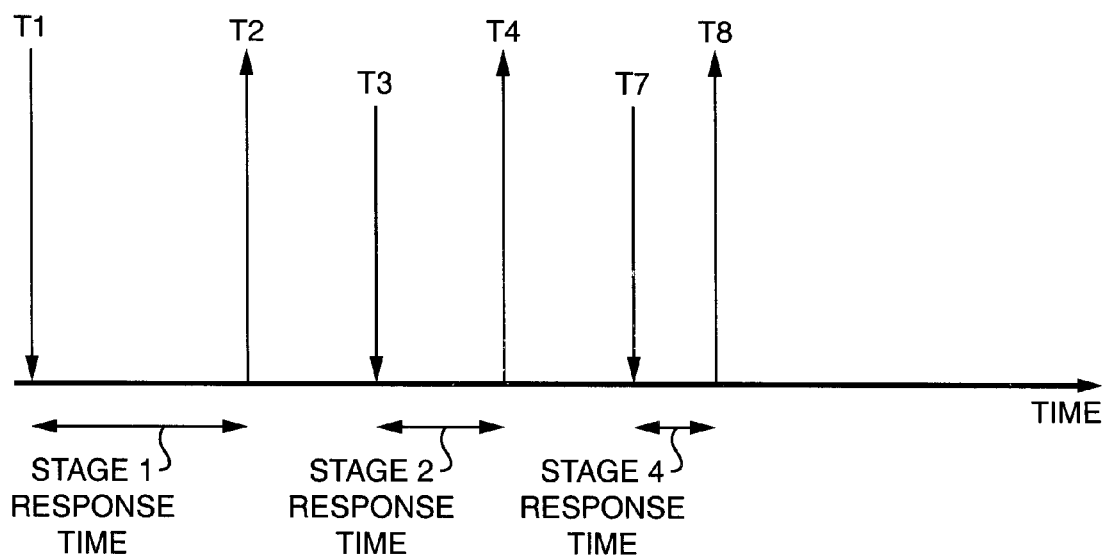
FIG. 7 is an exemplary diagram of the time it takes to setup a call without using caller authentication.

FIG. 7 is an exemplary diagram of the time it takes to setup a call in a system where caller authentication is not needed. T1 represents the call originating phone number being entered into the system. T2 represents the remote answer tone or IVR message being detected in response to the call originating phone number. T3 represents the user-id being entered. T4 represents the remote answer tone or IVR message being detected in response to the user-id. T7 represents the destination phone number being entered. T8 represents the ring-back tone or busy tone being heard in response to the destination number. Stage 1 response time is T2-T1. Stage 2 response time is T4-T3. Stage 3 does not exist in this type of call setup. Stage 4 response time is T8-T7. The total setup time is the sum of the response times of stage 1, 2, and 4.

While the present invention has been described in connection with a preferred embodiment, many modifications will be readily apparent to those skilled in the art, and this application is intended to cover any adaptations or variations thereof. For example, the scripts that implement the present invention could also be used to measure call progress/setup times for single stage dialing. Call setup time management with or without background calls can also be performed with the system and method of the present invention. This invention should be limited only by the claims and equivalents thereof.

What is claimed is:

1. A method performed by a first device connected to a network for measuring call setup time, comprising:

sending a signal to a second device;

monitoring for an expected response from the second device;

repeatedly adjusting, when a vender specific tone is detected from the second device, an answer tone setting for the second device by changing at least one of an upper and lower bound frequency of a dual tone multi-frequency (DTMF) tolerance or altering a response detection window size until receipt of the expected response; and calculating an elapsed time between sending the signal and a receipt of the expected response.

2. The method of claim 1, wherein said signal is a call originating gateway phone number.

3. The method of claim 1, wherein said signal is a user-id.

4. The method of claim 1, wherein said signal is a user authentication number.

5. The method of claim 1, wherein said signal is a destination telephone number.

6. The method of claim 1, wherein said calculating step further comprises:

reading a time stamp associated with the sending of the signal;

reading a time stamp associated with a receipt of the response; and subtracting the time stamp associated with the sending the signal from the time stamp associated with the receipt of the response.

7. A tester for measuring call setup time comprising:

means for sending a signal to a device;

means for monitoring for an expected response from the device;

means for repeatedly adjusting, when a vender specific tone is detected from the second device, an answer tone setting for the second device until receipt of the expected response, wherein the means for adjusting includes at least one of means for changing an upper and lower bound frequency of a dual tone multi-frequency (DTMF) tolerance and means for altering a response detection window size; and means for calculating an elapsed time between sending the signal and a receipt of the expected response.

8. The tester of claim 7, wherein said signal is a call originating gateway phone number.

9. The tester of claim 7, wherein said signal is a user-id.

10. The tester of claim 7, wherein said signal is a user authentication number.

11. The tester of claim 7, wherein said signal is a destination telephone number.

12. The tester of claim 7, wherein said means for calculating further comprises:

means for reading a time stamp associated with the sending of the signal;

means for reading a time stamp associated with the receipt of the response; and means for subtracting the time stamp associated with the sending of the signal from the time stamp associated with the receipt of the response.

13. A tester for measuring call setup time, comprising:

a memory having program instructions; and a processor responsive to the program instructions to: send a signal to a device, monitor for an expected response from the device; repeatedly adjust, when a vender specific tone is detected from the second device, an answer tone setting for the second device until receipt of the expected response, wherein the adjusting includes at least one of changing an upper and lower bound frequency of a dual tone multi-frequency (DTMF) tolerance and altering a response detection window size; and calculate an elapsed time between sending the signal and a receipt of the expected response.

14. A system for measuring call setup time, comprising:

a circuit-switched network;

a packet network;

at least one gateway connecting the circuit-switched network to the packet network, the gateway operable to transfer information between the circuit-switched network and the packet network; and a tester connected to the circuit-switched network, the tester operable to place a telephone call over the packet network, wherein when the tester initiates a telephone call over a packet network, the tester sends a signal to a device, monitors for an expected response from the device, repeatedly adjusts an answer tone setting for the device until receipt of the expected response, and calculates an elapsed time between sending the signal and a receipt of the expected response.

* * * * *